United States Patent [19]

Tanisaki

[11] Patent Number: 5,391,855
[45] Date of Patent: Feb. 21, 1995

[54] APPARATUS FOR ATMOSPHERIC PLASMA TREATMENT OF A SHEET-LIKE STRUCTURE

[75] Inventor: Tatsuzo Tanisaki, Onomichi, Japan
[73] Assignee: Komoto Tech, Inc., Cedartown, Ga.
[21] Appl. No.: 103,772
[22] Filed: Aug. 10, 1993

Related U.S. Application Data

[63] Continuation-in-part of Ser. No. 920,058, Jul. 28, 1992, abandoned.

[51] Int. Cl.⁶ .......................... B23K 10/00; C23F 1/00
[52] U.S. Cl. ........................... 219/121.43; 219/121.48; 219/121.51; 156/345; 156/646; 204/298.31
[58] Field of Search ........................ 219/121.43, 121.44, 219/121.52, 121.48, 121.51; 156/646, 643, 345; 204/298.21, 298.31, 164; 34/115, 611, 629, 618

[56] References Cited

U.S. PATENT DOCUMENTS

| | | | |
|---|---|---|---|
| 4,362,632 | 12/1982 | Jacob | 422/183.04 |
| 4,556,450 | 12/1985 | Chuang et al. | 162/204 |
| 4,803,332 | 2/1989 | Koyama et al. | 219/121.52 |
| 5,099,100 | 3/1992 | Bersin et al. | 219/121.4 |
| 5,234,538 | 8/1993 | Luck | 156/644 |
| 5,252,178 | 10/1993 | Moslehi | 156/643 |

*Primary Examiner*—Mark H. Paschall

[57] ABSTRACT

An objective of the present invention is to provide a cylindrical, continuous plasma-processing apparatus capable of modifying the surface of a longitudinal substrate by a plasma process without the use of a vacuum, which has been required in the prior art.

The cylindrical, continuous plasma-processing apparatus is comprised of, as a major portion, a hollow cylinder formed of a porous outer periphery wall made of ceramics, rubbers, or glass, a porous network electrode, and a dielectric inner periphery wall. The interior of this cylinder portion contains a metallic pipe whose surface is covered by a dielectric wall such that when a gas is introduced therein, the gas can be diffused into the cylinder portion through perforations. In a space between the cylinder portion and the metallic pipe, there is an antenna, the surface of which is covered by a dielectric. When a high voltage is applied to the antenna, and with the network electrode and the metallic pipe serving as ground electrodes, a plasma is generated between the antenna, the network electrode, and the metallic pipe. Due to the positive pressure created by the introduction of the compressed gas into the cylinder area, the plasma passes through all of the porous surfaces, including the outer periphery wall of the hollow cylinder. A substrate to be processed, such as a polyester film, is brought into contact with the outer periphery wall to effect surface modification of the substrate with the atmospheric pressure plasma.

7 Claims, 3 Drawing Sheets

APPARATUS FOR ATMOSPHERIC PLASMA TREATMENT OF A SHEET-LIKE STRUCTURE

CROSS REFERENCE TO RELATED APPLICATIONS

This is a continuation-in-part application of Ser. No. 07/920,058, filed Jul. 28, 1992, now abandoned.

FIELD OF THE INVENTION

The present invention relates to a cylindrical plasma-processing apparatus for continuous plasma treatment of a substrate, such as textile or plastic sheet-like materials, using various gases by an atmospheric plasma producing method.

STATEMENT OF THE PRIOR ART

In general, it is well known that plasma is separated into ions and electrons upon the strong ionization of one or more gases by an electrically charged field, whereby the plasma exhibits overall inertness. Plasma has been used to modify the surface of substrates to be processed, such as plastics and textile fibers. For such surface modification of a substrate, the low-pressure plasma method using one or more gases, such as fluorine containing various compounds, acids, and argon or the like, has generally been employed.

The systems that have been used in the prior art to modify such substrates as mentioned above have utilized such methods as (a.) the batch type plasma apparatus (U.S. Pat. No. 4,803,332), and (b.) the air-to-air type plasma apparatus (U.S. Pat. No. 4,457,145).

Batch type plasma-processing includes apparatus in which a substrate unwinder, winder, and plasma-processing apparatus are all enclosed in a vacuum environment. Air-to-air type plasma-processing includes apparatus in which a winding roll and/or an unwinding roll are placed outside a vacuum tank while the plasma-processing apparatus is sealed in a vacuum environment. These two systems are used to plasma treat sheet-like substrates. Both methods require the use of a low-pressure vacuum environment to initiate plasma treatment of the substrate.

The disadvantages of these two types of plasma processing include the need for a vacuum pump and, furthermore, the need for an airtight chamber for ensuring a properly sealed environment. Therefore, the apparatus can be of such a large scale that it may be impractical for some uses as well as being quite expensive. Also, in the case that volatile substances, such as water, are contained in or on the substrate, both types of plasma-processing apparatus have the disadvantage of some difficulty in controlling the vacuum environment's pressure and gas ratio(s).

Japan Patent Application No. 63-202977 (S. Okazaki and M. Kogoma) describes an atmospheric pressure plasma apparatus using two plate-style electrodes, at least one of which contains a dielectric-layered surface that stabilizes the plasma by preventing an arc discharge, in a closed environment. The plasma discharge created between the electrodes is dependent upon the "gap distance" between the two electrodes and the gas flow rate. T. Yokoyama, M. Kogama, T. Moriwaki and S. Okazaki (J. Phys. D: Appl. Phys. 23 (1990) p. 1125-1128) have described the stabilization of glow plasma at atmospheric pressure by controlling the following three factors: (a.) the use of a high frequency source, (b.) the use of helium gas for dilution, and (c.) the insertion of a dielectric plate between electrodes.

The disadvantages of prior art atmospheric pressure plasma-processing include the following: (a.) dependency upon the "gap distance" between the two electrodes to create uniform plasma discharge and (b.) dependency upon the inlet gas flow rate and the gas concentration between the electrodes to create a uniform plasma discharge.

SUMMARY OF THE INVENTION

In order to solve the disadvantages of the prior art described above, the present invention provides a cylindrical apparatus for continuous plasma treatment, capable of effectively modifying the surface of a substrate (i.e. textile and plastic sheet-like materials) contacting the apparatus at atmospheric pressure instead of using a vacuum or low-pressure environment as shown in the prior art.

DETAILED DESCRIPTION OF THE INVENTION

The present invention incorporates an apparatus for atmospheric plasma-processing of a substrate, such as textile or plastic sheet-like material. Furthermore, the present invention is comprised of a porous cylinder portion whose interior contains a plasma generating system that produces plasma under atmospheric pressure that is emitted from the interior of the cylinder through the porous periphery wall of said cylinder. A substrate to be processed by the atmospheric plasma is brought into contact with the outer peripheral surface of the cylinder portion to produce surface modification of the substrate with the atmospheric pressure plasma.

Furthermore, in the above-described apparatus for continuous, atmospheric plasma processing, the atmospheric pressure plasma generating system includes: (a.) a cylinder portion, whose peripheral wall is formed as an electrode having numerous pores and provided with a dielectric surface, (b.) a metallic pipe capable of diffusing a gas introduced into the interior of the cylinder portion, the surface of the metallic pipe being covered by a dielectric, and (c.) an antenna disposed in a space between the cylinder portion and the metallic pipe, the surface of the antenna being covered by a dielectric. In the atmospheric pressure plasma generating system, an atmospheric pressure plasma can be generated by using the antenna as a high voltage applying electrode and the metallic pipe and peripheral wall electrode serving as ground electrodes, respectively.

According to the above-described structure, an atmospheric pressure glow plasma is generated in the interior of the cylinder and this plasma passes through to the exterior surface of the cylinder. A substrate to be processed is brought into contact with the exterior surface of the cylinder portion, whereby surface modification of the substrate can be effectively maintained using the atmospheric pressure plasma covering the exterior surface of the cylinder portion. Accordingly, since the surface modification of the substrate can occur under atmospheric pressure, and a vacuum pump or the like is not required, not only can the apparatus be made on a small scale, as compared to the conventional plasma-processing apparatus for processing longitudinal substrates, but also a cost reduction in facility expenses can be realized.

The present invention will now be explained with respect to the illustrated Examples.

Figure 1:
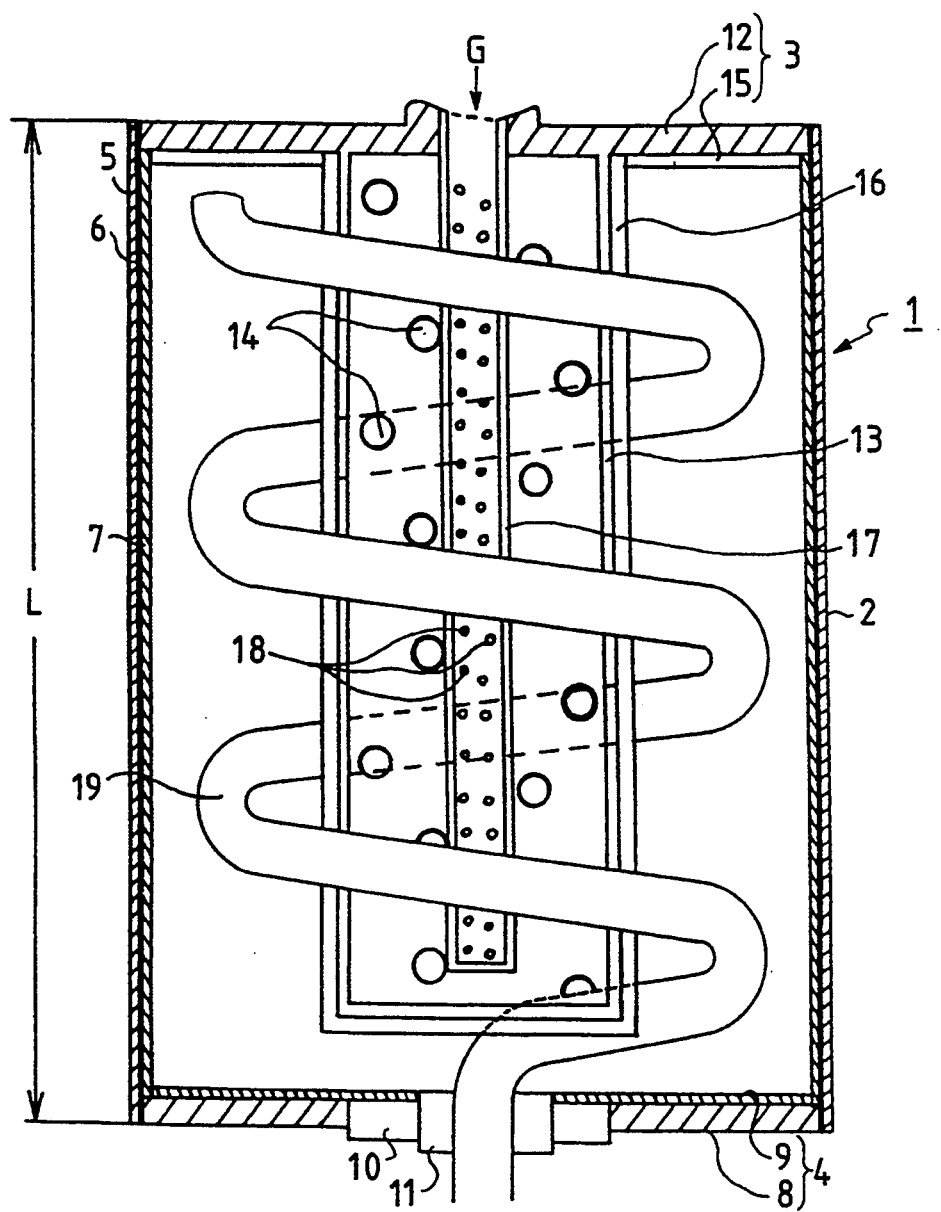
FIG. 1 is a cross sectional view showing a major portion of the cylindrical, continuous plasma-processing apparatus according to the present invention.

FIG. 1 is an explanatory view of the cylindrical, continuous plasma processing apparatus, showing the basic structure of the cylinder, including the plasma-generating system of the present invention.

In this view, a cylinder portion (1) has an upper wall member (3) on the upper surface of a hollow cylinder (2), and a bottom wall member (4) provided in the bottom surface of the hollow cylinder (2). Thus a hollow portion is provided in the interior of the cylinder portion (1). In the hollow cylinder (2), an outer periphery wall (5) formed of a porous electrical insulator, made of such materials as rubbers, plastics, ceramics, or glass, comprises the outermost side thereof. A metallic network electrode (6) is provided immediately inside thereof, covered by a porous dielectric wall (7) that forms the innermost periphery wall of hollow cylinder (2). Furthermore, the bottom wall member (4) is comprised of a metallic disc member (8) and a dielectric wall (9) provided thereon. The metallic disc member (8) is formed in such a size that the side surface thereof is in contact with the inner periphery portion of the above-described network electrode (6). When the side surface of this metallic disc member (8) contacts the inner periphery portion of the network electrode (6), the network electrode (6) is electrically connected to the metallic disc member (8). The dielectric wall (9) is placed above the metallic disc member (8) and is in a disc-like shape having such a size that it contacts the inner periphery surface of the dielectric inner periphery wall (7). In the vicinity of the center of this metallic disc member (8), the metallic disc member (8) is fixed to a moving side member of a thrust bearing (10). This bearing (10) rotates the cylinder to advance the substrate surface across the contact area. A fixing side portion of this bearing (10) is fixed to an electrical insulator to insulate a rotating center axis of the hollow cylinder (2). This insulator (11) also penetrates through the dielectric wall (9). Furthermore, the upper wall member (3) is comprised of a metallic disc member (12) and a dielectric wall (15). This metallic disc member (12) is formed such that its side surface contacts the inner periphery portion of the above-described network electrode (6). In the inside of the above-described upper wall member (3), a metallic pipe (13) is fixed to the metallic disc member (12); thereby, the metallic disc member (12) and the metallic pipe (13) are electrically connected to each other. This metallic pipe (13) has a closed-end and a length slightly shorter than the length (L) of the hollow cylinder (2), and perforations (14) are provided in the periphery wall thereof. In this metallic pipe (13), a center axis is disposed such that it is coincident with the center axis of the hollow cylinder (2). Furthermore, in the outer portion of the metallic pipe (13), the dielectric wall (15) is covered by the lower side of the metallic disc member (12) of the above-described upper wall member (3). Similarly, a dielectric wall (16) is also covered by the outer periphery surface of the above-described metallic pipe (13). This dielectric wall (16) is provided with perforations corresponding to the perforations (14) of the metallic pipe (13), a gas-introduction pipe (17) is provided on the rotating center axis of the hollow cylinder (2). This gas-introduction pipe (17) is a pipe having a slightly shorter length and a smaller diameter as compared with the length and the diameter of the metallic pipe (13), and a number of perforations (18) are provided in the periphery wall thereof, through which the introduced gas (G) can be led into the interior of the metallic pipe (13). In the space between the dielectric inner periphery wall (7) of the above-described cylinder (2) and the outer periphery dielectric wall (16) of the metallic pipe (13), an antenna (19) covered by a dielectric layer (20) is provided in a spiral manner while being fixed to the insulator (11). This antenna (19) serves as the rotating center axis of the hollow cylinder (2) in the bottom wall member (4). Furthermore, a high voltage is applied to the antenna (19), and the metallic pipe (13) and the network electrode (6) serve as ground electrodes.

The atmospheric pressure plasma-generating system is composed in such a manner that a mixed gas (G) having a pressure higher than atmospheric pressure is taken in from the gas-introduction pipe (17); the gas is diffused in the interior of the cylinder portion (1) from the metallic pipe (13) while a high voltage is applied to the antenna (19) with the metallic pipe (13) and the network electrode (6) serving as ground electrodes, whereby an atmospheric pressure glow plasma is generated in the interior of the periphery wall surface of the cylinder portion (1) and this plasma will be emitted by permeation to the exterior surface of the hollow cylinder (2).

Figure 2:
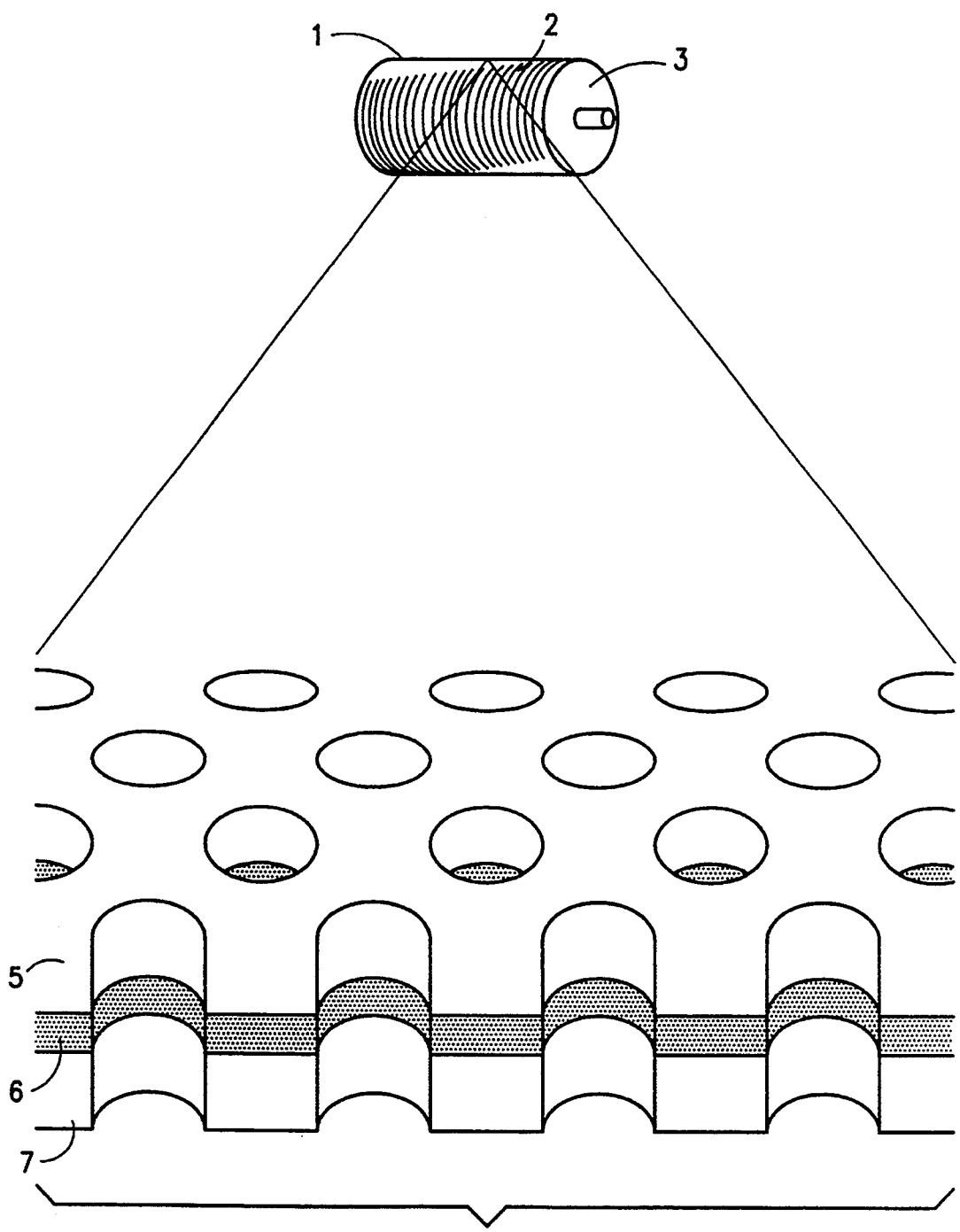
FIG. 2 is a longitudinal section view of the three layers in the present invention cylinder wall.

FIG. 2 is a longitudinal section view of the cylinder that is comprised of three layers; (a.) the outer periphery wall (5) formed of a porous electrical insulator made of such materials as rubbers, plastics, ceramics, or glass, (b.) the porous metallic network electrode (6), and (c.) the porous dielectric layer (7) which covers the metallic network electrode (6) and forms the innermost periphery wall of the hollow cylinder (2).

Figure 3:
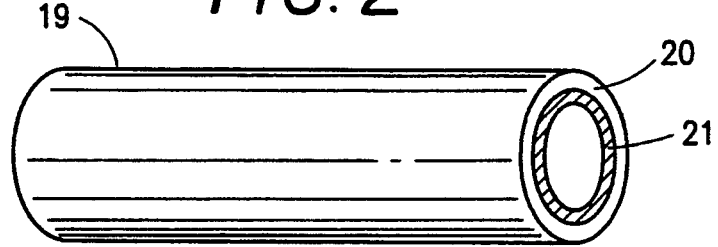
FIG. 3 is a cross sectional view of the antenna (19), including the interior antenna portion (21) which is covered by a dielectric layer (20)

FIG. 3 is a cross sectional view of the antenna (19) including the interior antenna portion (21) which is covered by a dielectric layer (20).

Figure 4:
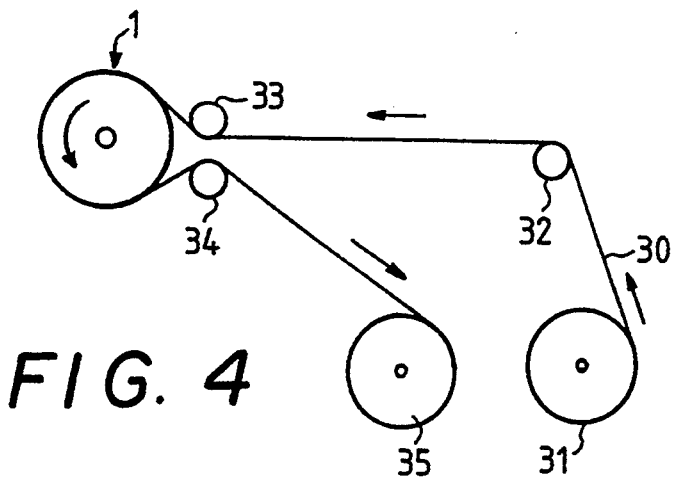
FIG. 4 is a explanatory view of the present invention to illustrate, by example, the use of the present invention to surface treat a sheet-like roll material; and, FIG. 5 is a explanatory view showing another example of the use of the present invention as a pair for treating both surfaces of a sheet-like roll material.

FIG. 4 is a structural view of the present invention to illustrate, by example, the use of the cylindrical, continuous plasma-processing apparatus to surface treat a substrate. In FIG. 4, the cylindrical, continuous plasma-processing apparatus is structured in such a manner that a polyester film (30), upon using an unwinder (31) to remove the polyester film (30) from its delivery roll, is brought into contact with the exterior surface of the cylinder portion (1) via a guide roll (32) and an auxiliary roll (33) and then wound up by a winder (35) via an auxiliary roll (34). The unwinder (31), the winder (35), and the cylinder portion (1) are synchronously rotated by a driving source, such as a motor in a given drive mechanism (not shown).

The operation of the above-described example using the cylindrical, continuous plasma-processing apparatus will be hereunder explained (Refer to FIG. 1). The mixed gas (G) of helium (He) gas and oxygen ($O_2$) gas introduced through the gas-introduction pipe (17) passes into the interior of the metallic pipe (13). The thus introduced mixed gas (G) is diffused into the interior of the hollow cylinder (2) through the perforations (14) of the metallic pipe (13). Then, when a high voltage is applied to the antenna (19), which is covered by a dielectric (20), and with the network electrode (6) and the metallic pipe (13) serving as ground electrodes, a plasma is generated between the antenna (19), the network electrode (6), and the metallic pipe (13). Due to the positive pressure created by the introduction of the compressed gases into the cylinder area, the plasma passes through all of the porous surfaces, including the outer periphery wall of the hollow cylinder (2), to contact the polyester film (30) which has been taken out from the unwinder (31) via the guide roll (32) and the auxiliary roll (33) to contact the outer periphery surface of the cylinder portion (1) and then wound up by the winder roll (35) via the auxiliary roll (34). When the polyester film (30) is brought into contact with the outer periphery surface of the cylinder portion (1), the surface modification is affected by the atmospheric pressure plasma generated on the outer periphery surface of the hollow cylinder (2) of the above-described cylinder portion (1), whereby the polyester film (30) is modified such that it exhibits hydrophilicity. As a result of processing the surface of the polyester film (30) by utilizing the plasma which uniformly covers the outer periphery surface of the cylinder portion (1), the surface of the polyester film (30) becomes uniformly hydrophilic. When the thus modified polyester film (30) was measured for contact angle by using pure water, the contact angle shoed a value of 30°. Prior to treatment, the polyester film had a contact angle of 70° using pure water. In the above-described example, only one surface of the polyester film (30) is subjected to surface modification; however, if the unwinder (31) is reversed such that the other surface of the polyester film (30) is brought into contact with the cylinder portion (1), then both surfaces of the polyester film (30) can be treated for surface modification. The auxiliary roll (33) and the auxiliary roll (34) are used for the purpose of bringing the polyester film (30) into close contact with the outer periphery surface of the cylinder portion (1).

Figure 5:
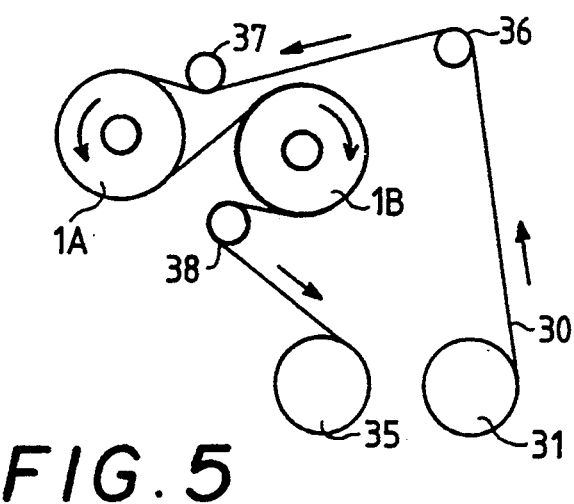

FIG. 5 is a plan view showing another example of the use of the present invention. In the cylindrical, continuous plasma-processing apparatus shown in FIG. 5, structural elements which are the same as those in the above-described example are shown with the same numerals as previously used in FIG. 4 for explanation. The cylindrical, continuous plasma-processing apparatus shown in FIG. 5 is an apparatus in which both surfaces of the polyester film (30) can be subjected to surface modification at the same time. This apparatus is provided with cylinder portions (1A) and (1B) having the same structure as (1) in the above-described example, an unwinder (31), a winder (35), a guide roll (36), an auxiliary roll (37) in the vicinity of the cylinder portion (1A), and an auxiliary roll (38) in the vicinity of the cylinder portion (1B). One surface of the polyester film (30) is taken out from the delivery roll at the unwinder (31) and is brought into contact with the outer periphery surface of the cylinder portion (1A) via the guide roll (36) and the auxiliary roll (37); the other surface of the polyester film (30) is subsequently brought into contact with the cylinder portion (1B), and the polyester film (30) is then wound up by the winder (35) via the auxiliary roll (38).

The operation of the last example showing the cylindrical, continuous plasma-processing apparatus to modify both sides of a substrate simultaneously will be hereunder explained. The cylinder portions (1A) and (1B) have the same structure as those of the cylinder portion (1) shown in FIG. 1, and each of the structural elements is shown with an "A" added after the numeral for the cylinder portion (1A) and with a "B" added after the numeral for the cylinder portion (1B), respectively, for explanation. In this example, both surfaces of the polyester film (30) are subjected to surface modification to produce the same properties.

In the cylinder portion (1A), a mixed gas (G) of helium (He) and oxygen ($O_2$) gas, which has been introduced through a gas-introduction pipe (17A), is led into the interior of a metallic pipe (13A). Similarly, in the cylinder portion (1B), a mixed gas (G) of He gas and $O_2$ gas, which has been introduced through a gas-introduction pipe (17B), is led into the interior of a metallic pipe (13B). The thus introduced gas mixture (G) is diffused into the interiors of hollow cylinders (2A) and (2B) through perforations (14A) and (14B) of the metallic pipes (13A) and (13B), respectively. In the cylinder portion (1A), when a high voltage is applied to an antenna (19A) which is covered by a dielectric (20A), and with the network electrode (6A) and the metallic pipe (13A) serving as ground electrodes, a plasma is generated between the antenna (19A), the network electrode (6A) and the metallic pipe (13A). Similarly, in the cylinder portion (1B), when a high voltage is applied to an antenna (19B) which is covered by a dielectric (20B), and with the network electrode (6B) and the metallic pipe (13B) serving as ground electrodes, a plasma is generated between the antenna (19B), the network electrode (6B) and the metallic pipe (13B). Due to the positive pressure created by the introduction of the compressed gases into the cylinder area, the plasma passes through all of the porous surfaces, including the outer periphery wall of the hollow cylinders (2A) and (2B), one surface of the polyester film (30) which has been taken out from the unwinder (31) is brought into contact with the outer periphery surface of the cylinder portion (1A) via the guide roll (36) and the auxiliary roll (37), and the other surface of the polyester film (30) is then brought into contact with the outer periphery surface of the cylinder portion (1B). The polyester film (30) is then wound up by the winder (35) via the auxiliary roll (38). When the polyester film (30) is brought into contact with the outer periphery surface of the cylinder portion (1A), the surface modification is affected by the atmospheric pressure plasma generated on the outer periphery surface of the hollow cylinder (2A) of the above-described cylinder portion (1A), whereby the polyester film (30) is modified such that it exhibits hydrophilicity. Similarly, the surface modification of the second side of the polyester film (30) is affected by the atmospheric pressure plasma generated on the outer periphery surface of the hollow cylinder (2B) of the above-described cylinder portion (1B), whereby the polyester film (30) is modified such that it exhibits hydrophilicity. As a result of processing the front and back surfaces of the polyester film (30) by utilizing the plasmas which uniformly cover the outer periphery surfaces of the cylinder portions (1A) and (1B), the front and back surfaces of the polyester film become uniformly hydrophilic.

In the above-described second example, the plasma is generated using the same mixed gas (G) in both cylinder portions (1A) and (1B). However, the modification of the front and back surfaces of the polyester film (30) can be effected by introducing a different gas into each of the cylinder portions (1A) and (1B) to generate a plasma. In addition, in the present examples, if the size, shape or position of the perforations on the surface of the cylinder, the type of gas to be introduced, or the flow of the gas to be introduced is changed, the surface of the substrate can be arbitrarily modified. Furthermore, in the above-described examples, the mixed gas (G) was composed of He gas and $O_2$ gas; however, other gas mixtures, such as, for example, Ne gas and solvent gas, Ar gas and $CF_4$ gas, or $N_2$ and monomer gas, can also be used.

In light of the above, since an atmospheric pressure plasma can be used, benefits of the present invention include the elimination of the need for a vacuum pump or the like, such that the entire apparatus can therefore be made smaller, and the facility expenses can be greatly reduced. In addition, according to the present invention, the surface of a substrate can be subjected to selective plasma processing.

What is claimed is:

1. A cylindrical, continuous plasma-processing apparatus comprising:
   a porous hollow cylinder means defining an exterior region and an interior region; and
   a plasma generating means, located within the interior region of said hollow cylinder means, for forming an atmospheric pressure glow plasma to alter a sheet material in contact with said hollow cylinder in the exterior region at atmospheric pressure, through permeation through said porous hollow cylinder.

2. The apparatus of claim 1 wherein said porous hollow cylinder means comprises:
   a porous cylindrical wall including a porous exterior insulator layer, a porous middle electrode layer, and a porous interior dielectric layer;
   an upper endwall including an exterior metallic disc layer contacting the porous middle electrode layer of said porous cylindrical wall, said upper endwall further including an interior dielectric layer contacting the porous interior dielectric layer of said porous cylindrical wall, said exterior metallic disc layer and interior dielectric layer each further including an aperture formed, concentrically, therein; and,
   a lower endwall including an exterior metallic disc layer contacting the porous middle electrode layer of said porous cylindrical wall, said lower endwall further including an interior dielectric layer contacting the porous interior dielectric layer of said porous cylindrical wall, said exterior metallic disc layer and interior dielectric layer each further including an aperture formed, concentrically, therein.

3. The apparatus of claim 2 wherein the plasma generating means comprises:
   a porous metallic pipe having a porous dielectric cover layer, said pipe extending into said porous hollow cylinder, concentrically with said porous cylinder wall, said pipe further having one end closed through contact with said upper endwall exterior metallic disc and having another end closed within said hollow cylinder;
   a porous gas pipe passing through the aperture in said upper endwall, extending concentrically into said porous metallic pipe, said pipe having one end within said hollow cylinder closed, and through which gas is introduced into the hollow cylinder through a second open end;
   a ground electrode formed from the interconnected said porous middle electrode layer, said endwall metallic discs and porous metallic pipe; and,
   an antenna including an interior antenna portion with a dielectric layer covering, said antenna passing through the aperture in said lower endwall, insulated therefrom, and formed in a spiral around said porous metallic pipe and said porous gas pipe, the spiral axis concentric with said porous cylindrical wall 4. The apparatus of claim 2 wherein the plasma generating means comprises:
   gas introducing means for introducing gas into the interior portion of said porous hollow cylinder;
   a ground electrode;
   a porous metallic pipe having a porous dielectric cover layer, said pipe extending into said porous hollow cylinder, concentric with said porous cylindrical wall, said pipe further having one end closed through contact with said upper endwall exterior metallic disc and having another end closed within said hollow cylinder; and,
   an antenna means for forming an atmospheric pressure plasma in the interior of the porous hollow cylinder when a plasma inducing voltage is applied across the antenna and the ground electrode.

5. The apparatus of claim 4 wherein the gas introducing means comprises:
   a porous gas pipe passing through the aperture in said upper endwall, extending into said porous hollow cylinder, concentric with said porous cylindrical wall, said pipe having one end within said porous hollow cylinder closed, and through which gas is introduced into the porous hollow cylinder through a second open end.

6. The apparatus of claim 4 wherein the antenna means comprises:
   an interior antenna portion; and,
   a dielectric layer covering said interior antenna portion, said antenna means passing through the aperture in said lower endwall, insulated therefrom, and formed in a spiral around said porous metallic pipe and said gas introducing means, the spiral axis concentric with said porous cylindrical wall.

7. The apparatus of claim 4 wherein said ground electrode means is formed from the interconnected said porous middle electrode layer, said endwall metallic discs and porous metallic pipe.

* * * * *

UNITED STATES PATENT AND TRADEMARK OFFICE
CERTIFICATE OF CORRECTION

PATENT NO. : 5,391,855
DATED : February 21, 1995
INVENTOR(S) : TATSUZO TANISAKI It is certified that error appears in the above-identified patent and that said Letters Patent is hereby corrected as shown below:

On the cover page of the patent, please insert: After item [63], under

--Foreign Application Priority Data

Aug. 1, 1991 [JP]  Japan...........214149/1991--.

Item [73]
On the cover page of the patent, under "Assignee", change "Komoto" to "Kimoto".

Signed and Sealed this

Ninth Day of May, 1995

*Attest:*

BRUCE LEHMAN

*Attesting Officer*     *Commissioner of Patents and Trademarks*